(12) United States Patent
Song (10) Patent No.: US 11,481,600 B2
(45) Date of Patent: Oct. 25, 2022

(54) SEMICONDUCTOR DEVICES (71) Applicant: SK hynix Inc., Icheon-si Gyeonggi-do (KR)

(72) Inventor: Choung Ki Song, Yongin-si Gyeonggi-do (KR)

(73) Assignee: SK hynix Inc., Icheon-si (KR)

( * ) Notice: Subject to any disclaimer, the term of this patent is extended or adjusted under 35 U.S.C. 154(b) by 522 days.

(21) Appl. No.: 16/712,313

(22) Filed: Dec. 12, 2019

(65) Prior Publication Data

US 2021/0027134 A1 Jan. 28, 2021

(30) Foreign Application Priority Data

Jul. 24, 2019 (KR) .................. 10-2019-0089879

(51) Int. Cl.
*G06N 3/04* (2006.01)
*G06F 13/36* (2006.01)

(52) U.S. Cl.
CPC .............. *G06N 3/04* (2013.01); *G06F 13/36* (2013.01)

(58) Field of Classification Search
CPC .................................. G06N 3/04; G06F 13/36
See application file for complete search history.

(56) References Cited

U.S. PATENT DOCUMENTS

| | | | | |
|---|---|---|---|---|
| 2006/0092333 A1* | 5/2006 | Kang | .................. | G11C 7/1078 348/699 |
| 2010/0019814 A1* | 1/2010 | Park | ..................... | G11C 7/1066 327/162 |
| 2014/0063963 A1* | 3/2014 | Li | ..................... | H01L 27/11573 365/185.17 |
| 2015/0067201 A1* | 3/2015 | Song | .................. | G06F 13/4022 710/51 |
| 2015/0127873 A1* | 5/2015 | Yun | ..................... | G11C 7/1084 710/310 |
| 2016/0042773 A1* | 2/2016 | Cho | ........................ | G11C 7/22 365/191 |
| 2018/0121796 A1 | 5/2018 | Deisher et al. | | |
| 2019/0147327 A1* | 5/2019 | Martin | ..................... | G06N 3/04 706/15 |
| 2020/0285446 A1* | 9/2020 | Han | ....................... | G06F 7/5443 |
| 2021/0027149 A1* | 1/2021 | Song | ..................... | G06F 7/575 |
| 2021/0174179 A1* | 6/2021 | Song | ..................... | G06F 7/5443 |

FOREIGN PATENT DOCUMENTS

KR 1020170097633 A 8/2017

\* cited by examiner

*Primary Examiner* — Phong H Dang
(74) *Attorney, Agent, or Firm* — William Park & Associates Ltd.

(57) ABSTRACT

A semiconductor device includes a core output driver, a pad input driver, and an arithmetic result data generation circuit. The core output driver transmits a first data, output from a core region, to a global input/output (I/O) line when an arithmetic operation is performed. The pad input driver transmits a second data, input through a pad region, to the global I/O line when the arithmetic operation is performed. The arithmetic result data generation circuit sequentially receives the first data and the second data through the global I/O line, to generate a core data and a pad data. The arithmetic result data generation circuit also performs an arithmetic operation, used in a neural network, based on the core data and the pad data, to generate arithmetic data.

32 Claims, 10 Drawing Sheets

SEMICONDUCTOR DEVICES

CROSS-REFERENCE TO RELATED APPLICATIONS

The present application claims priority under 35 U.S.C 119(a) to Korean Application No. 10-2019-0089879, filed on Jul. 24, 2019, which is incorporated herein by reference in its entirety.

BACKGROUND

1. Technical Field

Embodiments of the present disclosure relate to semiconductor devices providing a neural network.

2. Related Art

In a neural network, neurons, mathematically modelled to resemble to a human brain, are connected to each other to form a network. Recently, neural network technologies have been quickly developing. Accordingly, a lot of effort has been focused on analyzing input data and extracting useful information using neural network technologies in various electronic devices.

SUMMARY

According to an embodiment, a semiconductor device includes a core output driver, a pad input driver, and an arithmetic result data generation circuit. The core output driver is configured to transmit a first data, output from a core region, to a global input/output (I/O) line when an arithmetic operation is performed. The pad input driver is configured to transmit a second data, input through a pad region, to the global I/O line when the arithmetic operation is performed. The arithmetic result data generation circuit is configured to sequentially receive the first data and the second data through the global I/O line, to generate a core data and a pad data. In addition, the arithmetic result data generation circuit is configured to perform an arithmetic operation, used in a neural network, based on the core data and the pad data, to generate arithmetic data.

According to another embodiment, a semiconductor device includes a first core output driver, a second core output driver, a pad input driver, and an arithmetic result data generation circuit. The first core output driver is configured to transmit a first data, output from a first core region, to a first global input/output (I/O) line when an arithmetic operation is performed. The second core output driver is is configured to transmit a second data, output from a second core region, to a second global I/O line when the arithmetic operation is performed. The pad input driver is configured to transmit a third data, input through a pad region, to the first and second global I/O lines when the arithmetic operation is performed. The arithmetic result data generation circuit is configured to receive the first data and the second data, through the first and second global I/O lines, to generate a core data, configured to receive the third data, through the first and second global I/O lines to generate a pad data, and configured to perform an arithmetic operation, used in a neural network, based on the core data and the pad data to generate arithmetic data.

According to yet another embodiment, a semiconductor system includes a command decoder and a neural network circuit. The command decoder is configured to generate a core output pulse, a first latch control pulse, a pad input pulse, a second latch control pulse, and a third latch control pulse when an arithmetic operation is performed. The neural network circuit is configured to transmit a first data, stored in a core region, to a global input/output (I/O) line when the core output pulse is created, configured to latch the first data, transmitted to the global I/O line, to generate a core data when the first latch control pulse is created, configured to transmit a second data, input through a pad region, to the global I/O line when the pad input pulse is created, and configured to latch the second data, transmitted to the global I/O line, to generate a pad data when the second latch control pulse is created.

According to still another embodiment, a semiconductor system includes a command decoder and a neural network circuit. The command decoder is configured to generate a selection signal, a core output pulse, a first latch control pulse, a pad input pulse, a second latch control pulse, and a third latch control pulse when an arithmetic operation is performed. The neural network circuit is configured to transmit a first data stored in a first core region to a first global input/output (I/O) line or to transmit a second data stored in a second core region to a second global I/O line when the core output pulse is created, configured to latch the first data, transmitted to the first global I/O line, to generate a core data or to latch the second data, transmitted to the second global I/O line, to generate the core data when the first latch control pulse is created, configured to transmit a third data, input through a pad region, to the first and second global I/O lines when the pad input pulse is created, and configured to latch the third data, transmitted to the first and second global I/O lines, to generate a pad data when the second latch control pulse is created.

DETAILED DESCRIPTION OF THE EMBODIMENTS

Various embodiments of the present disclosure will be described hereinafter with reference to the accompanying drawings. However, the embodiments described herein are for illustrative purposes only and are not intended to limit the scope of the present disclosure.

The terms used in the present application are merely used to describe particular embodiments, and are not intended to limit the present disclosure. Singular forms in the present disclosure are intended to include the plural forms as well, unless the context clearly indicates otherwise. It will be further understood that terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

Figure 1:
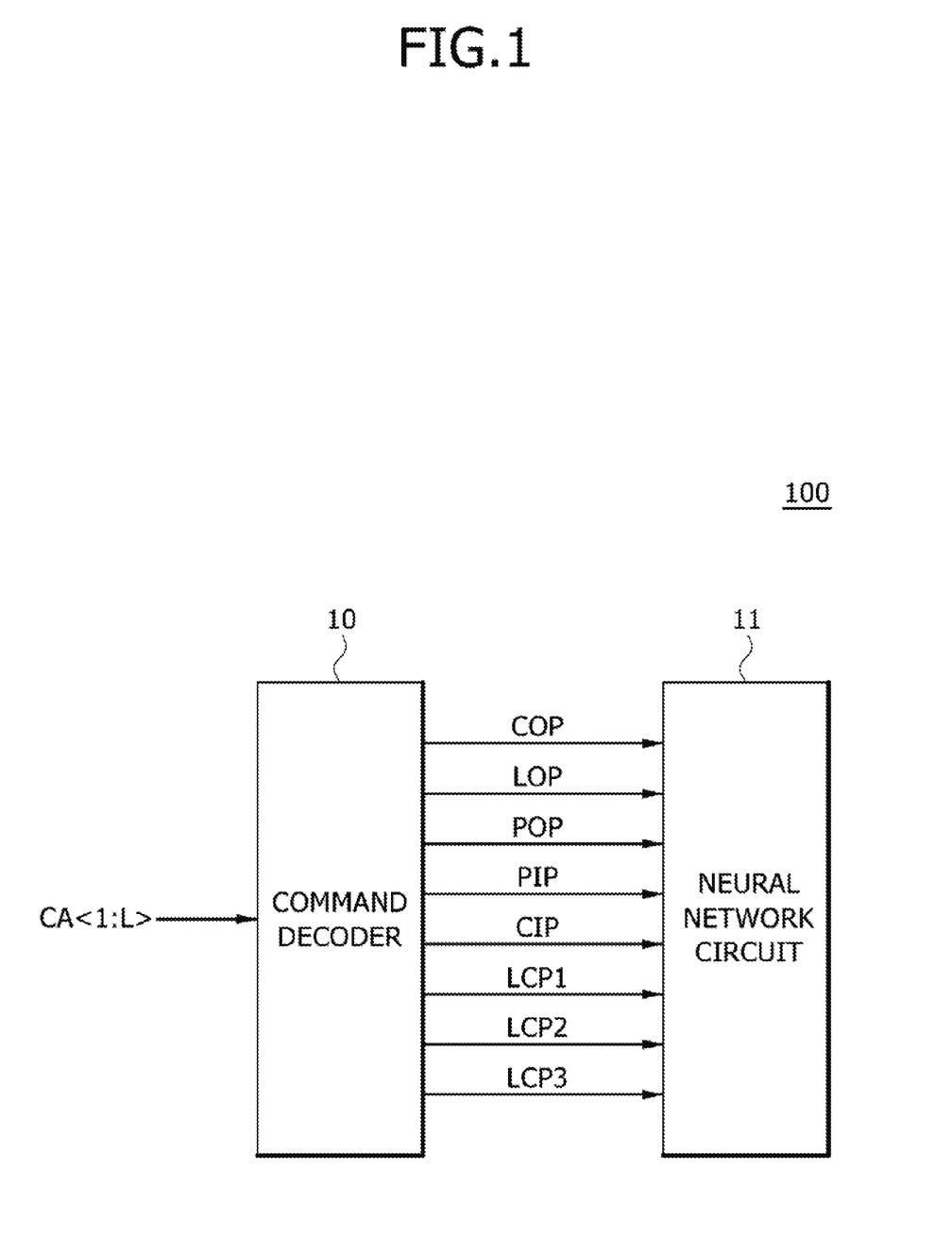
FIG. 1 is a block diagram, illustrating a configuration of a semiconductor device, according to an embodiment of the present disclosure.

As illustrated in FIG. 1, a semiconductor device 100, according to an embodiment, may include a command decoder 10 and a neural network circuit 11.

The command decoder 10 may decode a control signal CA<1:L> to generate and output a core output pulse COP, a latch output pulse LOP, a pad output pulse POP, a pad input pulse PIP, a core input pulse CIP, a first latch control pulse LCP1, a second latch control pulse LCP2, and a third latch control pulse LCP3 to the neural network circuit 11. The control signal CA<1:L> may include at least one of a command and an address. The command decoder 10 may generate the core output pulse COP and the pad output pulse POP when a read command, for performing a read operation, is input to the command decoder 10 through the control signal CA<1:L>. The command decoder 10 may generate the core output pulse COP, the pad input pulse PIP, the first latch control pulse LCP1, the second latch control pulse LCP2, and the third latch control pulse LCP3 when an arithmetic command, for performing an arithmetic operation used in a neural network (i.e., the neural network circuit 11), is input to the command decoder 10 through the control signal CA<1:L>. The command decoder 10 may generate the latch output pulse LOP and the pad output pulse POP to output arithmetic result data (LFD of FIG. 2), generated by the arithmetic operation of the neural network circuit 11, when an arithmetic read command, for performing an arithmetic read operation, is input to the command decoder 10.

The neural network circuit 11 may transmit first data generated by a core region (21 of FIG. 2) to a pad region (23 of FIG. 2) when the command decoder 10 generates the core output pulse COP and the pad output pulse POP, based on the read command. The neural network circuit 11 may perform the arithmetic operation, used in the neural network, to generate the arithmetic result data (LFD of FIG. 2), based on the first data, output from the core region (21 of FIG. 2), and second data, input through the pad region (23 of FIG. 2), when the command decoder 10 generates the core output pulse COP, the pad input pulse PIP, the first latch control pulse LCP1, the second latch control pulse LCP2, and the third latch control pulse LCP3, based on the arithmetic command. The core region (21 of FIG. 2) may output the first data stored therein when the read operation or the arithmetic operation is performed. The neural network circuit 11 may output the arithmetic result data (LFD of FIG. 2) through the pad region (23 of FIG. 2) when the command decoder 10 generates the latch output pulse LOP and the pad output pulse POP based on the arithmetic read command. The arithmetic operation may include at least one of a multiplying operation and an adding operation for feature values and weighted values. The arithmetic operation may be performed to sort features, included in an input layer, into result values, included in an output layer. The arithmetic operation may be performed by using various functions such as SIGMOID, Tanh, ReLU, or the like. The feature values may be values corresponding to the features included in the input layer, and the weighted values may be values that influence the sorting of the features, included in the input layer, into the result values, included in the output layer. The first data may be set as the feature values, used in the neural network, and the second data may be set as the weighted values, used in the neural network. Alternatively, the first data may be set as the weighted values, and the second data may be set as the feature values.

Figure 2:
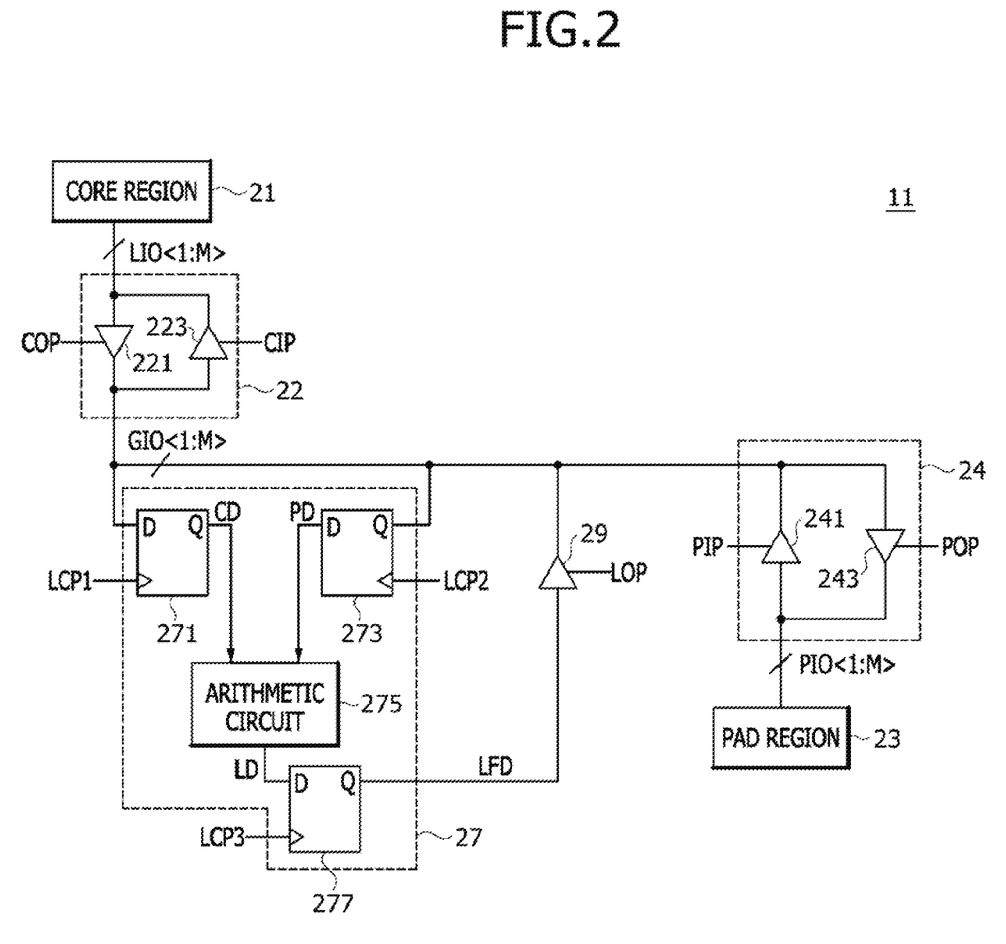
FIG. 2 illustrates an example of a neural network circuit included in the semiconductor device of FIG. 1.

Referring to FIG. 2, the neural network circuit 11 may include the core region 21, a core input/output (I/O) circuit 22, the pad region 23, a pad I/O circuit 24, an arithmetic result data generation circuit 27, and an arithmetic result output driver 29.

The core region 21 may include a memory cell array (not shown) and may output the first data, stored in the memory cell array, to local I/O lines LIO<1:M> when the read operation or the arithmetic operation is performed. The first data, stored in the core region 21, may include information on the feature values or the weighted values. The number "M" of the local I/O lines LIO<1:M> may be set as a natural number which is equal to or greater than two. When the read operation or the arithmetic operation is performed, the number of first data bits, output from the core region 21 through the local I/O lines LIO<1:M>, may be equal to or less than the number "M".

The core I/O circuit 22 may include a core output driver 221 and a core input driver 223. The core output driver 221 may be activated by the core output pulse COP to output data, loaded on the local I/O lines LIO<1:M>, to global I/O lines GIO<1:M> when the read operation is performed. The core input driver 223 may be activated by the core input pulse CIP to output data, loaded on the global I/O lines GIO<1:M>, to the local I/O lines LIO<1:M> when the write operation is performed. In other words, the core I/O circuit 22 may output the data, loaded on the local I/O lines LIO<1:M>, to global I/O lines GIO<1:M> when the read operation is performed. On the other hand, the core I/O circuit 22 may output the data, loaded on the global I/O lines GIO<1:M>, to the local I/O lines LIO<1:M> when the write operation is performed.

The pad region 23 may include a plurality of pads (not shown). When the read operation is performed, the first data may be transmitted to the pad region 23 through the local I/O lines LIO<1:M>, the global I/O lines GIO<1:M>, and pad I/O lines PIO<1:M>. When the arithmetic operation is performed, the second data may be transmitted to the pad I/O lines PIO<1:M> and the global I/O lines GIO<1:M>. When the arithmetic read operation is performed, the arithmetic result data LFD may be output to the pad region 23 through the global I/O lines GIO<1:M> and the pad I/O lines PIO<1:M>. The second data may include the feature values or the weighted values.

The pad I/O circuit 24 may include a pad input driver 241 and a pad output driver 243. The pad input driver 241 may be activated by the pad input pulse PIP, which is created when the arithmetic operation is performed, to transmit the second data to the pad I/O lines PIO<1:M> and the global I/O lines GIO<1:M>. The pad output driver 243 may be activated by the pad output pulse POP, which is created when the read operation is performed, to transmit the first data to the pad region 23 through the local I/O lines LIO<1:M>, the global I/O lines GIO<1:M>, and the pad I/O lines PIO<1:M>. The pad output driver 243 may be activated by the pad output pulse POP, which is created when the arithmetic read operation is performed, to transmit the arithmetic result data LFD to the pad region 23 through the global I/O lines GIO<1:M> and the pad I/O lines PIO<1:M>. In other words, the pad I/O circuit 24 may transmit the second data to the pad I/O lines PIO<1:M> and the global I/O lines GIO<1:M> when the arithmetic operation is performed. On the other hand, the pad I/O circuit 24 may transmit the first data to the pad region 23 through the local I/O lines LIO<1:M>, the global I/O lines GIO<1:M>, and the pad I/O lines PIO<1:M> when the read operation is performed. Additionally, the pad I/O circuit 24 may transmit the arithmetic result data LFD to the pad region 23 through the global I/O lines GIO<1:M> and the pad I/O lines PIO<1:M> when the arithmetic read operation is performed.

The arithmetic result data generation circuit 27 may include a first input data latch 271, a second input data latch 273, an arithmetic circuit 275, and a data output latch 277. The first input data latch 271 may be synchronized with the first latch control pulse LCP1, which is created when the arithmetic operation is performed. The first input data latch 271 and the first latch control pulse LCP1 are synchronized to receive and latch the first data through the global I/O lines GIO<1:M>, and to output the latched first data as core data CD. The second input data latch 273 may be synchronized with the second latch control pulse LCP2, which is created when the arithmetic operation is performed. The second input data latch 273 and the second latch control pulse LCP2 are synchronized to receive and latch the second data, input through the pad region 23 and the global I/O lines GIO<1:M>, and to output the latched second data as pad data PD. The arithmetic circuit 275 may receive the core data CD and the pad data PD and may perform the arithmetic operation to generate the arithmetic data LD. The data output latch 277 may be synchronized with the third latch control pulse LCP3, which is created when the arithmetic operation is performed. The third input data latch 277 and the third latch control pulse LCP3 are synchronized to latch the arithmetic data LD and to output the latched data of the arithmetic data LD as the arithmetic result data LFD. The arithmetic result data generation circuit 27 may receive the core data CD and the pad data PD when the arithmetic operation is performed and may perform the arithmetic operation to generate the arithmetic result data LFD.

The arithmetic result output driver 29 may receive the arithmetic result data LFD to drive the global I/O lines GIO<1:M> based on the latch output pulse LOP, created when the arithmetic read operation is performed. The arithmetic result output driver 29 may output the arithmetic result data LFD to the global I/O lines GIO<1:M> when the arithmetic read operation is performed.

Figure 3:
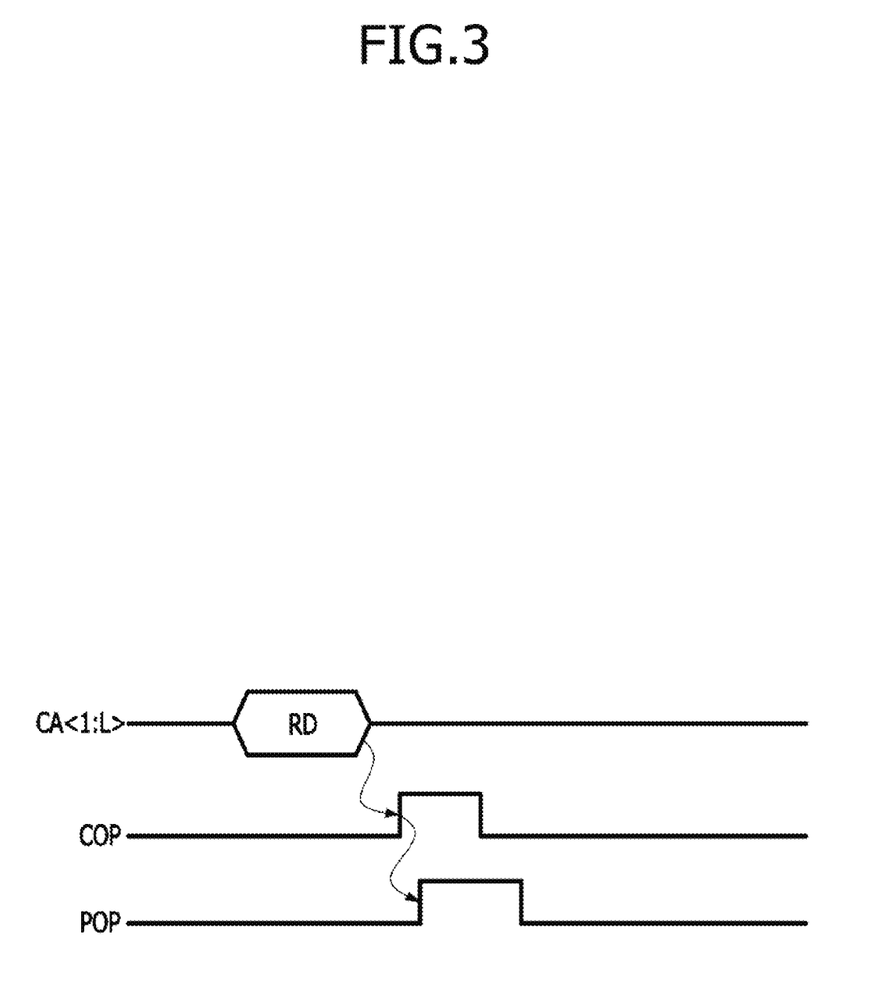
FIGS. 3 to 6 are timing diagrams, illustrating various operations of the semiconductor device, shown in FIGS. 1 and 2.

The read operation of the semiconductor device 100 will be described in more detail hereinafter with reference to FIG. 3.

When a read command RD, for the read operation, is input to the command decoder 10 through the control signal CA<1:L>, the command decoder 10 may sequentially generate the core output pulse COP and the pad output pulse POP. The neural network circuit 11 may transmit the first data, output from the core region 21 to the pad region 23 through the local I/O lines LIO<1:M>, the global I/O lines GIO<1:M>, and pad I/O lines PIO<1:M> when the core output pulse COP and the pad output pulse POP are generated.

Figure 4:
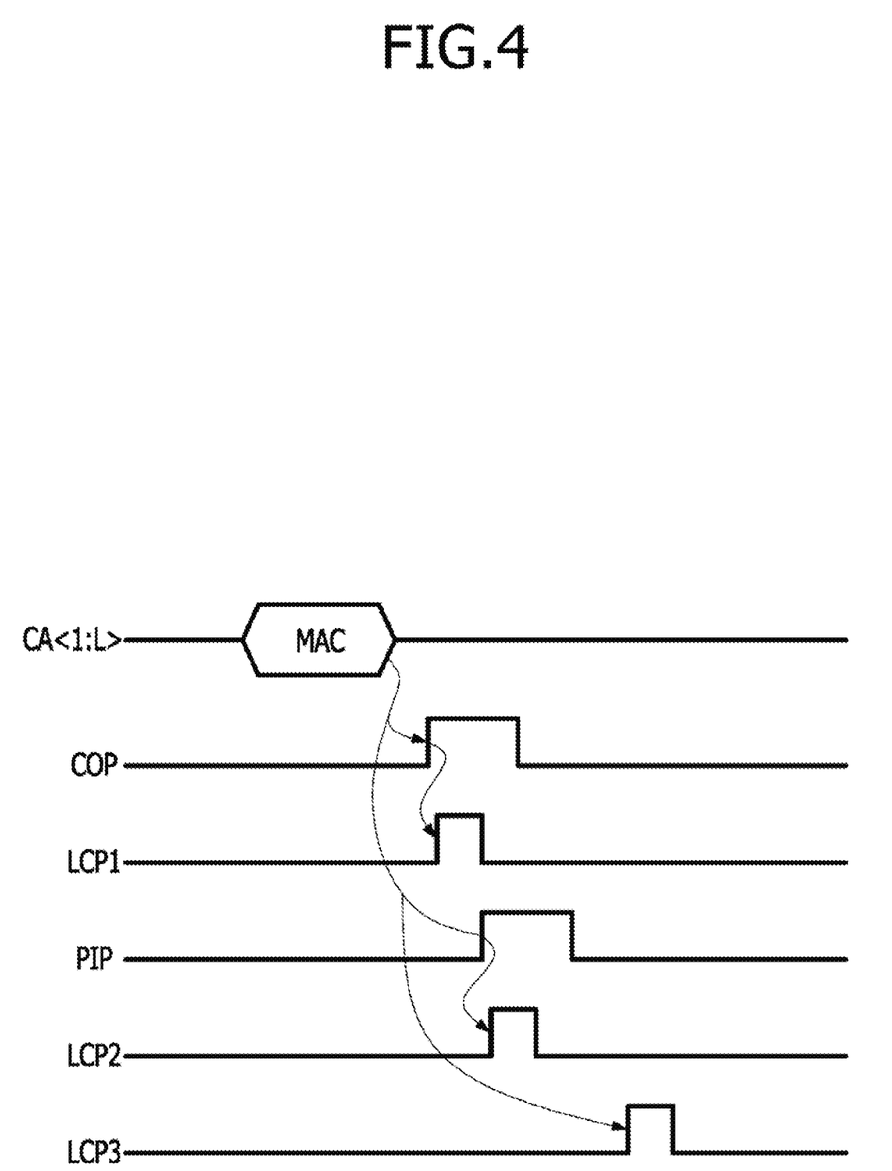

An example of the arithmetic operation of the semiconductor device 100 will be described in detail hereinafter with reference to FIG. 4.

When an arithmetic command MAC, for the arithmetic operation, is input to the command decoder 10 through the control signal CA<1:L>, the command decoder 10 may sequentially generate the core output pulse COP, the first latch control pulse LCP1, the pad input pulse PIP, the second latch control pulse LCP2, and the third latch control pulse LCP3. The neural network circuit 11 may latch the first data to generate the core data CD when the core output pulse COP and the first latch control pulse LCP1 are created. The neural network circuit 11 may latch the second data to generate the pad data PD when the pad input pulse PIP and the second latch control pulse LCP2 are created. The neural network circuit 11 may receive the core data CD and the pad data PD and may perform the arithmetic operation to generate the arithmetic data LD. The neural network circuit 11 may latch the arithmetic data LD when the third latch control pulse LCP3 is created and may output the latched data of the arithmetic data LD as the arithmetic result data LFD.

The semiconductor device 100 may be configured to generate the core data CD, including information on the feature values from the first data may be configured to generate the pad data PD, including information on the weighted values from the second data input through the pad region 23, and may be configured to generate the arithmetic result data LFD based on the core data CD and the pad data PD. Alternatively, the semiconductor device 100 may be configured to generate the core data CD, including information on the weighted values from the first data may be configured to generate the pad data PD, including information on the feature values from the second data input through the pad region 23, and may be configured to generate the arithmetic result data LFD based on the core data CD and the pad data PD.

Figure 5:
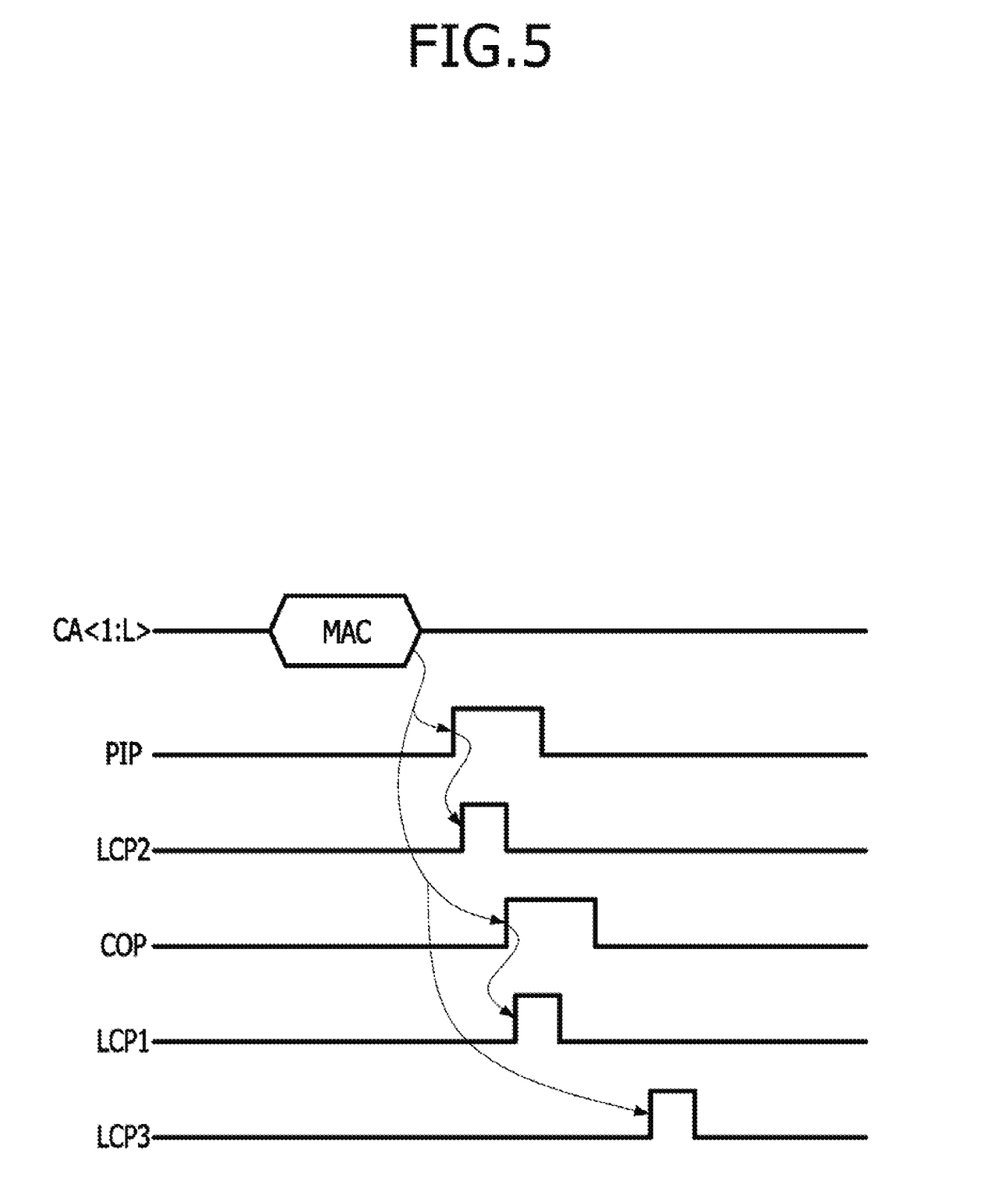

Another example of the arithmetic operation of the semiconductor device 100 will be described in detail hereinafter with reference to FIG. 5.

When the arithmetic command MAC, for the arithmetic operation, is input to the command decoder 10, through the control signal CA<1:L>, the command decoder 10 may sequentially generate the pad input pulse PIP, the second latch control pulse LCP2, the core output pulse COP, the first latch control pulse LCP1, and the third latch control pulse LCP3. The neural network circuit 11 may latch the second data, input through the pad region 23, to generate the pad data PD when the pad input pulse PIP and the second latch control pulse LCP2 are created. The neural network circuit 11 may latch the first data to generate the core data CD when the core output pulse COP and the first latch control pulse LCP1 are created. The neural network circuit 11 may receive the core data CD and the pad data PD and may perform the arithmetic operation to generate the arithmetic data LD. The neural network circuit 11 may latch the arithmetic data LD when the third latch control pulse LCP3 is created and may output the latched data of the arithmetic data LD as the arithmetic result data LFD.

The semiconductor device 100 may be configured to generate the pad data PD, including information on the weighted values from the second data, input through the pad region 23, may be configured to generate the core data CD, including information on the feature values from the first data and may be configured to generate the arithmetic result data LFD based on the core data CD and the pad data PD. Alternatively, the semiconductor device 100 may be configured to generate the pad data PD, including information on the feature values from the second data, input through the pad region 23, may be configured to generate the core data CD, including information on the weighted values from the first data and may be configured to generate the arithmetic result data LFD based on the core data CD and the pad data PD.

Figure 6:
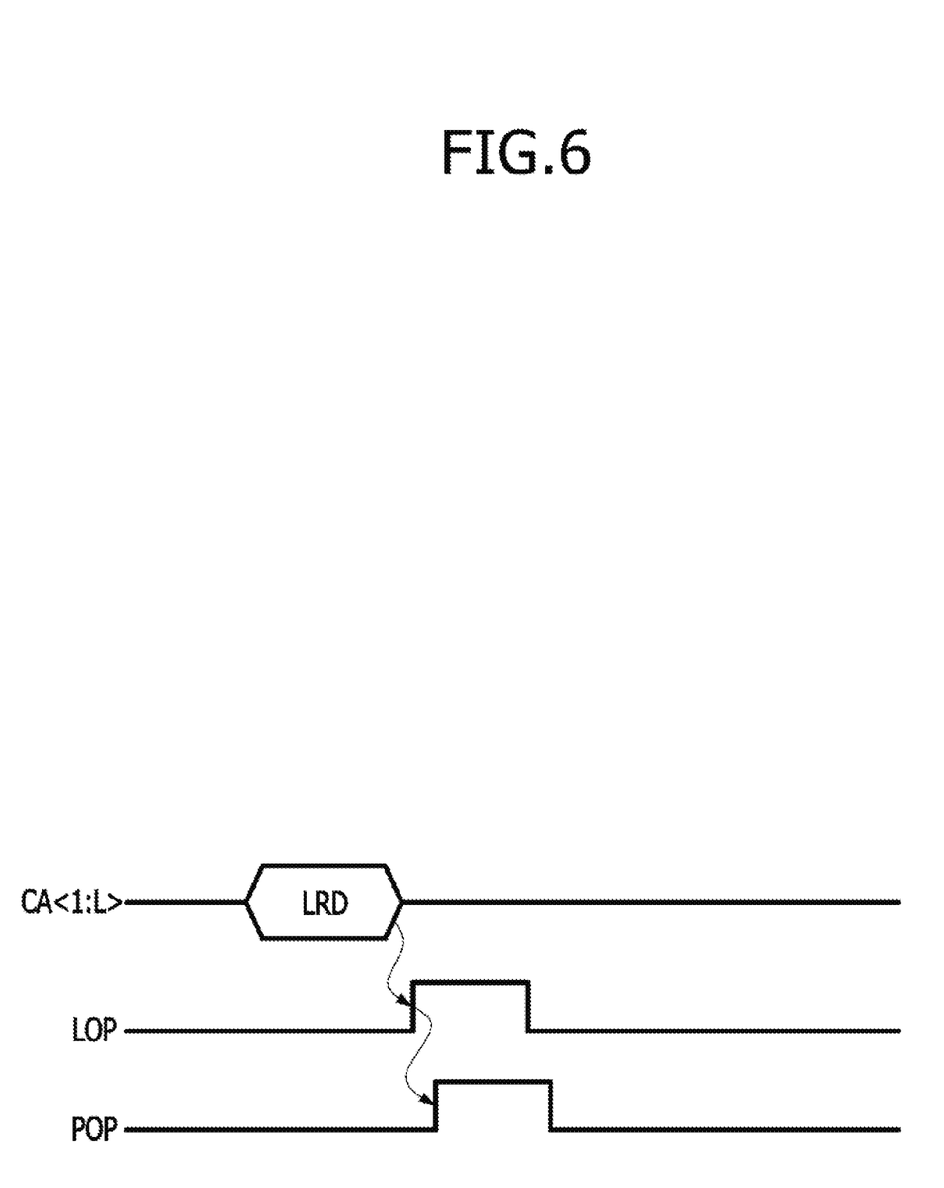

The arithmetic read operation of the semiconductor device 100 will be described in detail hereinafter with reference to FIG. 6.

When an arithmetic read command LRD is input to the command decoder 10 through the control signal CA<1:L>, the command decoder 10 may sequentially generate the latch output pulse LOP and the pad output pulse POP. The neural network circuit 11 may transmit the arithmetic result data LFD to the pad region 23 through the global I/O lines GIO<1:M> and pad I/O lines PIO<1:M> when the latch output pulse LOP and the pad output pulse POP are generated.

Figure 7:
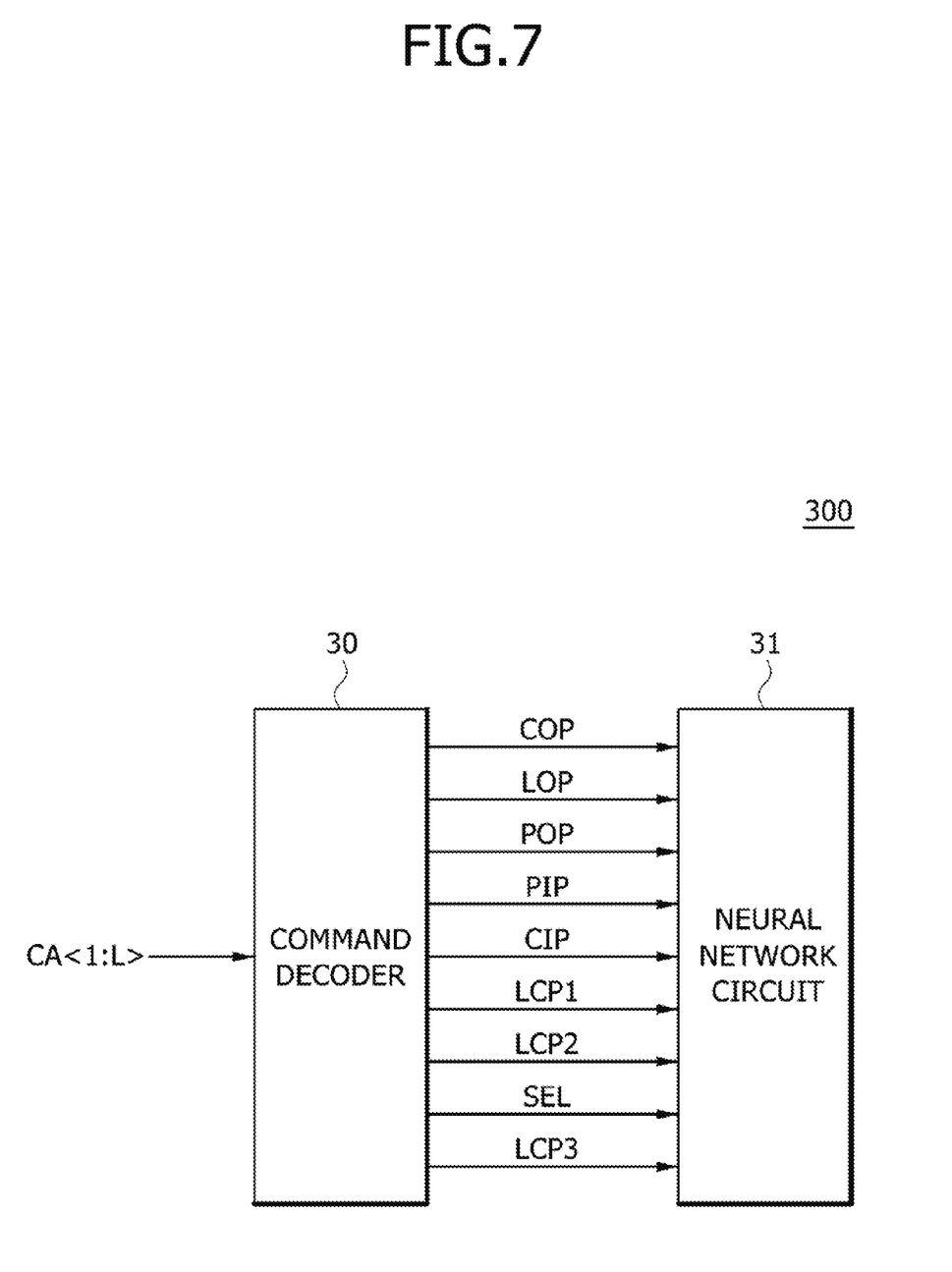
FIG. 7 is a block diagram, illustrating a configuration of a semiconductor device, according to another embodiment of the present disclosure.

As illustrated in FIG. 7, a semiconductor device 300 according to another embodiment may include a command decoder 30 and a neural network circuit 31.

The command decoder 30 may decode a control signal CA<1:L> to generate and output a core output pulse COP, a latch output pulse LOP, a pad output pulse POP, a pad input pulse PIP, a core input pulse CIP, a first latch control pulse LCP1, a second latch control pulse LCP2, a selection signal SEL, and a third latch control pulse LCP3 to the neural network circuit 31. The control signal CA<1:L> may include at least one of a command and an address. The command decoder 30 may generate the core output pulse COP and the pad output pulse POP when a read command, for performing a read operation, is input to the command decoder 30 through the control signal CA<1:L>. The command decoder 30 may generate the core output pulse COP, the pad input pulse PIP, the first latch control pulse LCP1, the second latch control pulse LCP2, the selection signal SEL, and the third latch control pulse LCP3 when an arithmetic command, for performing an arithmetic operation, used in a neural network, is input to the command decoder 30 through the control signal CA<1:L>. The command decoder 30 may generate the latch output pulse LOP and the pad output pulse POP to output arithmetic result data, generated by the arithmetic operation of the neural network circuit 31, when an arithmetic read command, for performing an arithmetic read operation, is input to the command decoder 30.

The neural network circuit 31 may transmit first data generated by a first core region (411 of FIG. 8) to a pad region (43 of FIG. 8) and may transmit second data generated by a second core region (413 of FIG. 8) to the pad region (43 of FIG. 8) when the command decoder 30 generates the core output pulse COP and the pad output pulse POP, based on the read command. The neural network circuit 31 may perform the arithmetic operation, used in the neural network, to generate arithmetic result data (LFD of FIG. 8) based on data, stored in the first core region (411 of FIG. 8), and data, input through the pad region (43 of FIG. 8), when the command decoder 30 receives the arithmetic command to generate the core output pulse COP, the pad input pulse PIP, the first latch control pulse LCP1, the second latch control pulse LCP2, and the third latch control pulse LCP3. The neural network circuit 31 may perform the arithmetic operation to generate the arithmetic result data (LFD of FIG. 8) based on data, stored in the second core region (413 of FIG. 8), and the data, input through the pad region (43 of FIG. 8), when the command decoder 30 receives the arithmetic command to generate the core output pulse COP, the pad input pulse PIP, the first latch control pulse LCP1, the second latch control pulse LCP2, the selection signal SEL, and the third latch control pulse LCP3. The neural network circuit 31 may output the arithmetic result data (LFD of FIG. 8) through the pad region (43 of FIG. 8) when the command decoder 30 receives the arithmetic read command to generate the latch output pulse LOP and the pad output pulse POP.

Figure 8:
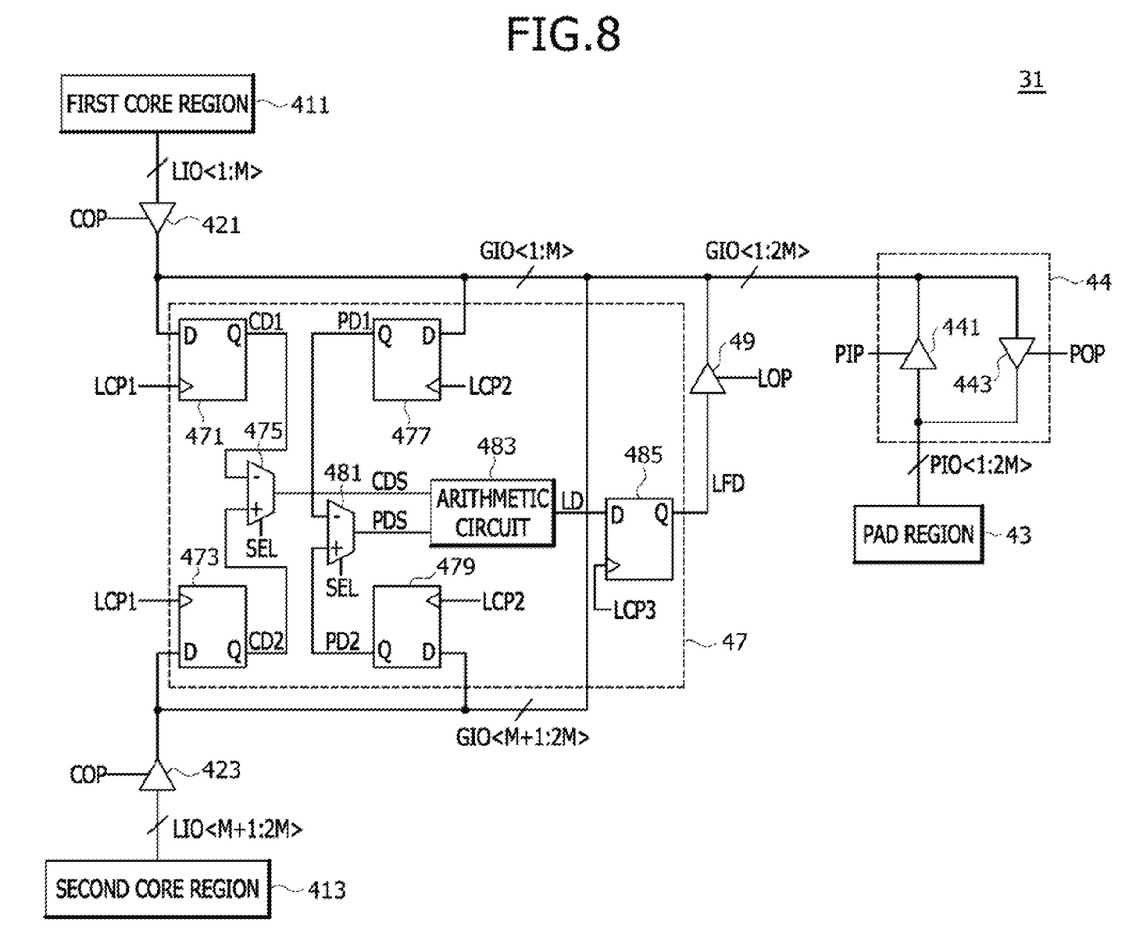
FIG. 8 illustrates an example of a neural network circuit included in the semiconductor device of FIG. 7.

Referring to FIG. 8, the neural network circuit 31 may include the first core region 411, a first core output driver 421, the second core region 413, a second core output driver 423, the pad region 43, a pad I/O circuit 44, an arithmetic result data generation circuit 47, and an arithmetic result output driver 49.

The first core region 411 may include a memory cell array (not shown) and may output the first data, stored in the memory cell array to first local I/O lines LIO<1:M>, when the read operation or the arithmetic operation is performed. The first data, stored in the first core region 411, may include information on the feature values or the weighted values, used in the neural network. The number "M" of the first local I/O lines LIO<1:M> may be set as a natural number which is equal to or greater than two. When the read operation or the arithmetic operation is performed, the number of first data bits, output from the first core region 411 through the first local I/O lines LIO<1:M> may be equal to or less than the number "M".

The first core output driver 421 may be activated by the core output pulse COP to output data, loaded on the first local I/O lines LIO<1:M>, to first global I/O lines GIO<1:M> when the read operation is performed.

The second core region 413 may include a memory cell array (not shown) and may output the second data, stored in the memory cell array, to second local I/O lines LIO<M+1:2M> when the read operation or the arithmetic operation is performed. The second data, stored in the second core region 413, may include information on the feature values or the weighted values. When the read operation or the arithmetic operation is performed, the number of second data bits, output from the second core region 413 through the second local I/O lines LIO<M+1:2M>, may be equal to or less than the number "M".

The second core output driver 423 may be activated by the core output pulse COP to output data, loaded on the second local I/O lines LIO<M+1:2M>, to second global I/O lines GIO<M+1:2M> when the read operation is performed.

The pad region 43 may include a plurality of pads (not shown). When the read operation is performed, the first data output from the first core region 411 may be transmitted to the pad region 43 through the first local I/O lines LIO<1:M>, the first global I/O lines GIO<1:M>, and pad I/O lines PIO<1:2M>. When the read operation is performed, the second data may be transmitted to the pad region 43 through the second local I/O lines LIO<M+1:2M>, the second global I/O lines GIO<M+1:2M>, and the pad I/O lines PIO<1:2M>. When the arithmetic operation is performed, third data input through the pad region 43 may be transmitted to the pad I/O lines PIO<1:2M>, the first global I/O lines GIO<1:M>, and the second global I/O lines GIO<M+1:2M>. When the arithmetic read operation is performed, the arithmetic result data LFD may be output to the pad region 43 through global I/O lines GIO<1:2M> and the pad I/O lines PIO<1:2M>. The third data may include the feature values or the weighted values.

The pad I/O circuit 44 may include a pad input driver 441 and a pad output driver 443. The pad input driver 441 may be activated by the pad input pulse PIP, which is created when the arithmetic operation is performed, to transmit the third data to the pad I/O lines PIO<1:2M>, the first global I/O lines GIO<1:M>, and the second global I/O lines GIO<M+1:2M>. The pad output driver 443 may be activated by the pad output pulse POP, which is created when the read operation is performed, to transmit the first data to the pad region 43, through the first local I/O lines LIO<1:M>, the first global I/O lines GIO<1:M>, and the pad I/O lines PIO<1:2M>. The pad output driver 443 may be activated by the pad output pulse POP, which is created when the read operation is performed, to transmit the second data to the pad region 43 through the second local I/O lines LIO<M+1:2M>, the second global I/O lines GIO<M+1:2M>, and the pad I/O lines PIO<1:2M>. The pad output driver 443 may be activated by the pad output pulse POP, which is created when the arithmetic read operation is performed, to transmit the arithmetic result data LFD to the pad region 43 through the global I/O lines GIO<1:2M> and the pad I/O lines PIO<1:2M>. The pad I/O circuit 44 may transmit the third data to the pad I/O lines PIO<1:2M>, the first global I/O lines GIO<1:M> and the second global I/O lines GIO<M+1:2M> when the arithmetic operation is performed. The pad I/O circuit 44 may transmit the first data to the pad region 43 through the first local I/O lines LIO<1:M>, the first global I/O lines GIO<1:M>, and the pad I/O lines PIO<1:2M> when the read operation is performed. The pad I/O circuit 44 may transmit the second data to the pad region 43 through the second local I/O lines LIO<M+1:2M>, the second global I/O lines GIO<M+1:2M>, and the pad I/O lines PIO<1:2M> when the read operation is performed. The pad I/O circuit 44 may transmit the arithmetic result data LFD to the pad region 43 through the global I/O lines GIO<1:2M> and the pad I/O lines PIO<1:2M> when the arithmetic read operation is performed.

The arithmetic result data generation circuit 47 may include a first core data latch 471, a second core data latch 473, a first data selector 475, a first pad data latch 477, a second pad data latch 479, a second data selector 481, an arithmetic circuit 483, and a data output latch 485.

The first core data latch 471 may be synchronized with the first latch control pulse LCP1, which is created when the arithmetic operation is performed, to receive and latch the first data through the first local I/O lines LIO<1:M> and the first global I/O lines GIO<1:M> and to output the latched first data as first core data CD1. The second core data latch 473 may be synchronized with the first latch control pulse LCP1, which is created when the arithmetic operation is performed, to receive and latch the second data through the second local I/O lines LIO<M+1:2M> and the second global I/O lines GIO<M+1:2M> and to output the latched second data as second core data CD2. The first data selector 475 output the first core data CD1 or the second core data CD2 as selected core data CDS based on the selection signal SEL.

The first pad data latch 477 may be synchronized with the second latch control pulse LCP2, which is created when the arithmetic operation is performed, to receive and latch the third data, the pad I/O lines PIO<1:2M>, and the first global I/O lines GIO<1:M> and to output the latched third data as first pad data PD1. The second pad data latch 479 may be synchronized with the second latch control pulse LCP2, which is created when the arithmetic operation is performed, to receive and latch the third data, the pad I/O lines PIO<1:2M>, and the second global I/O lines GIO<M+1:2M> and to output the latched third data as second pad data PD2. The second data selector 481 output the first pad data PD1 or the second pad data PD2 as selected pad data PDS based on the selection signal SEL.

The arithmetic circuit 483 may receive the selected core data CDS and the selected pad data PDS and may perform the arithmetic operation to generate arithmetic data LD. The data output latch 485 may be synchronized with the third latch control pulse LCP3, which is created when the arithmetic operation is performed, to latch the arithmetic data LD and to output the latched data of the arithmetic data LD as the arithmetic result data LFD.

The arithmetic result output driver 49 may receive the arithmetic result data LFD to drive the first and second global I/O lines GIO<1:M> and GIO<M+1:2M> based on the latch output pulse LOP created when the arithmetic read operation is performed. The arithmetic result output driver 49 may output the arithmetic result data LFD to the first and second global I/O lines GIO<1:M> and GIO<M+1:2M> when the arithmetic read operation is performed.

Figure 9:
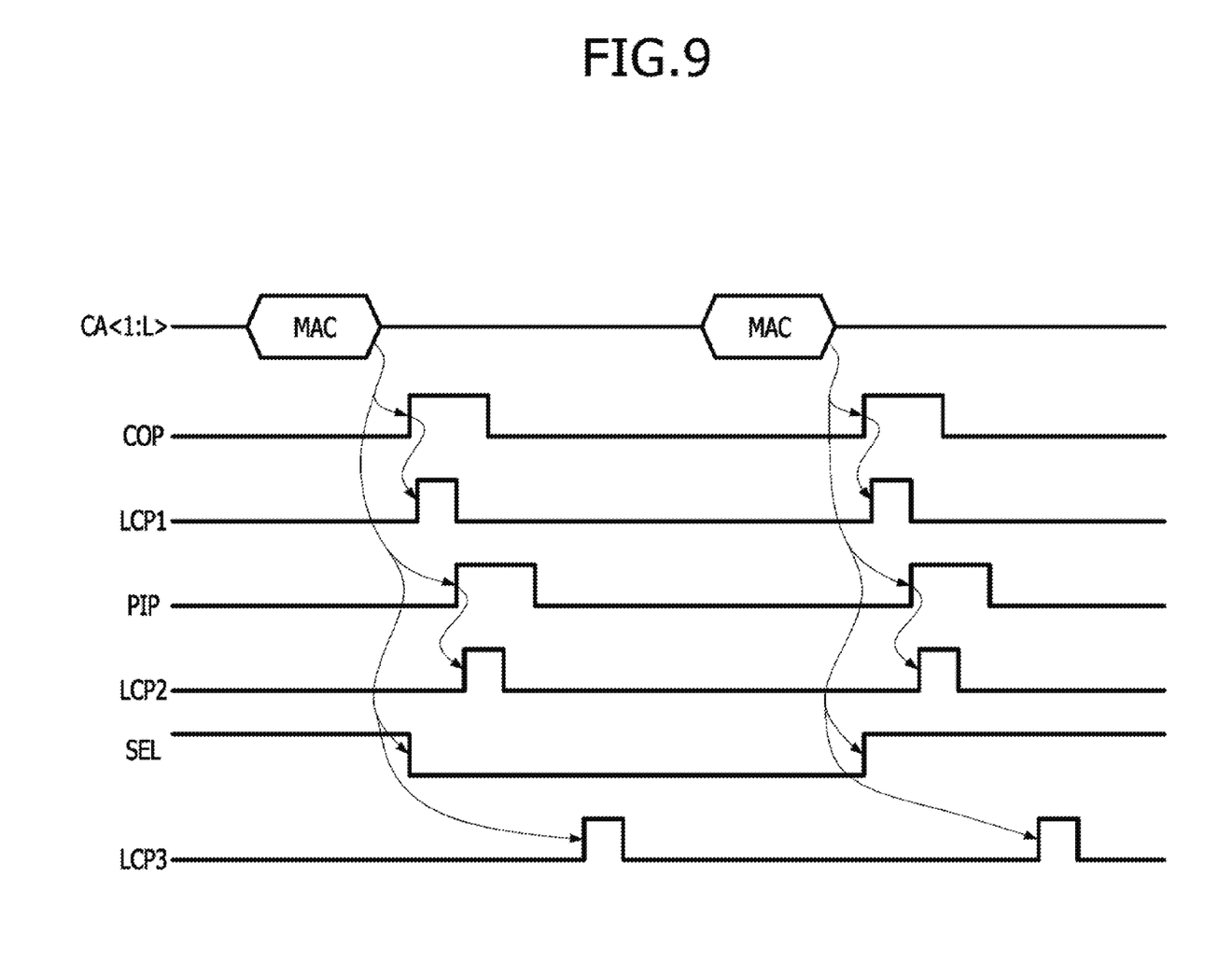
FIGS. 9 and 10 are timing diagrams, illustrating various operations of the semiconductor device, shown in FIGS. 7 and 8.

An example of the arithmetic operation of the semiconductor device 300 will be described in detail hereinafter with reference to FIG. 9.

When an arithmetic command MAC for the arithmetic operation is input to the command decoder 30 through the control signal CA<1:L> a first time, the command decoder 30 may sequentially generate the selection signal SEL, the core output pulse COP, the first latch control pulse LCP1, the pad input pulse PIP, the second latch control pulse LCP2, and the third latch control pulse LCP3. The neural network circuit 31 may latch the first data to generate the first core data CD1 when the selection signal SEL is generated to have a logic "low" level and the core output pulse COP and the first latch control pulse LCP1 are created. The neural network circuit 31 may output the first core data CD1 as the selected core data CDS when the selection signal SEL is generated to have a logic "low" level. The neural network circuit 31 may latch the third data to generate the first pad data PD1 when the pad input pulse PIP and the second latch control pulse LCP2 are created. The neural network circuit 31 may output the first pad data PD1 as the selected pad data PDS when the selection signal SEL is generated to have a logic "low" level. The neural network circuit 31 may receive the selected core data CDS and the selected pad data PDS and may perform the arithmetic operation to generate the arithmetic data LD. The neural network circuit 31 may latch the arithmetic data LD when the third latch control pulse LCP3 is created and may output the latched data of the arithmetic data LD as the arithmetic result data LFD.

When the arithmetic command MAC for the arithmetic operation is input to the command decoder 30 through the control signal CA<1:L> a second time, the command decoder 30 may sequentially generate the selection signal SEL, the core output pulse COP, the first latch control pulse LCP1, the pad input pulse PIP, the second latch control pulse LCP2, and the third latch control pulse LCP3. The neural network circuit 31 may latch the second data to generate the second core data CD2 when the selection signal SEL is generated to have a logic "high" level and the core output pulse COP and the first latch control pulse LCP1 are created. The neural network circuit 31 may output the second core data CD2 as the selected core data CDS when the selection signal SEL is generated to have a logic "high" level. The neural network circuit 31 may latch the third data to generate the second pad data PD2 when the pad input pulse PIP and the second latch control pulse LCP2 are created. The neural network circuit 31 may output the second pad data PD2 as the selected pad data PDS when the selection signal SEL is generated to have a logic "high" level. The neural network circuit 31 may receive the selected core data CDS and the selected pad data PDS and may perform the arithmetic operation to generate the arithmetic data LD. The neural network circuit 31 may latch the arithmetic data LD when the third latch control pulse LCP3 is created and may output the latched data of the arithmetic data LD as the arithmetic result data LFD.

The semiconductor device 300 may be configured to generate the selected core data CDS including information on the feature values from the first data or the second data, may be configured to generate the selected pad data PDS including information on the weighted values from the third data input through the pad region 43, and may be configured to generate the arithmetic result data LFD based on the selected core data CDS and the selected pad data PDS. Alternatively, the semiconductor device 300 may be configured to generate the selected core data CDS including information on the weighted values k from the first data or the second data, may be configured to generate the selected pad data PDS including information on the feature values from the third data input through the pad region 43, and may be configured to generate the arithmetic result data LFD based on the selected core data CDS and the selected pad data PDS.

Figure 10:
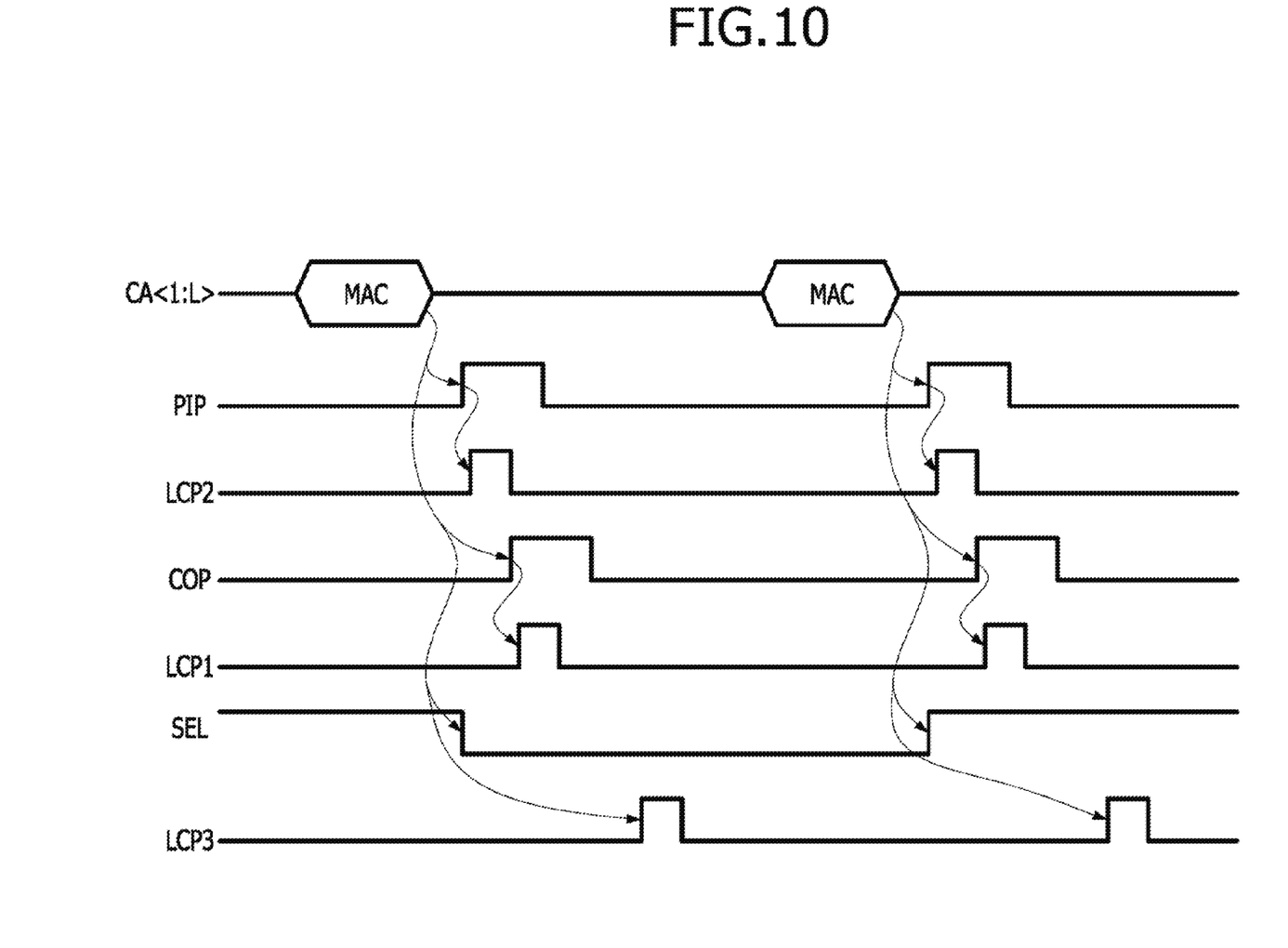

Another example of the arithmetic operation of the semiconductor device 300 will be described in detail hereinafter with reference to FIG. 10.

When the arithmetic command MAC for the arithmetic operation is input to the command decoder 30 through the control signal CA<1:L> a first time, the command decoder 30 may sequentially generate the pad input pulse PIP, the second latch control pulse LCP2, the selection signal SEL, the core output pulse COP, the first latch control pulse LCP1, and the third latch control pulse LCP3. The neural network circuit 31 may latch the third data input through the pad region 43 to generate the first pad data PD1 when the pad input pulse PIP and the second latch control pulse LCP2 are created. The neural network circuit 31 may output the first pad data PD1 as the selected pad data PDS when the selection signal SEL is generated to have a logic "low" level. The neural network circuit 31 may latch the first data to generate the first core data CD1 when the selection signal SEL is generated to have a logic "low" level and the core output pulse COP and the first latch control pulse LCP1 are created. The neural network circuit 31 may output the first core data CD1, as the selected core data CDS, when the selection signal SEL is generated to have a logic "low" level. The neural network circuit 31 may receive the selected core data CDS and the selected pad data PDS and may perform the arithmetic operation to generate the arithmetic data LD. The neural network circuit 31 may latch the arithmetic data LD when the third latch control pulse LCP3 is created and may output the latched data of the arithmetic data LD as the arithmetic result data LFD.

When the arithmetic command MAC for the arithmetic operation is input to the command decoder 30 through the control signal CA<1:L> a second time, the command decoder 30 may sequentially generate the pad input pulse PIP, the second latch control pulse LCP2, the selection signal SEL, the core output pulse COP, the first latch control pulse LCP1, and the third latch control pulse LCP3. The neural network circuit 31 may latch the third data input through the pad region 43 to generate the second pad data PD2 when the pad input pulse PIP and the second latch control pulse LCP2 are created. The neural network circuit 31 may output the second pad data PD2 as the selected pad data PDS when the selection signal SEL is generated to have a logic "high" level. The neural network circuit 31 may latch the second data to generate the second core data CD2 when the selection signal SEL is generated to have a logic "high" level and the core output pulse COP and the first latch control pulse LCP1 are created. The neural network circuit 31 may output the second core data CD2 as the selected core data CDS when the selection signal SEL is generated to have a logic "high" level. The neural network circuit 31 may receive the selected core data CDS and the selected pad data PDS and may perform the arithmetic operation to generate the arithmetic data LD. The neural network circuit 31 may latch the arithmetic data LD when the third latch control pulse LCP3 is created and may output the latched data of the arithmetic data LD as the arithmetic result data LFD.

The semiconductor device 300 may be configured to generate the selected pad data PDS including information on the weighted values from the third data input through the pad region 43, may be configured to generate the selected core data CDS including information on the feature values from the first data or the second data, and may be configured to generate the arithmetic result data LFD based on the selected core data CDS and the selected pad data PDS. Alternatively, the semiconductor device 300 may be configured to generate the selected pad data PDS including information on the feature values from the third data input through the pad region 43, may be configured to generate the selected core data CDS including information on the weighted values from the first data or the second data, and may be configured to generate the arithmetic result data LFD based on the selected core data CDS and the selected pad data PDS.

As described above, a semiconductor device according to an embodiment may sequentially receive feature values and weighted values according to an arithmetic command to control such that an arithmetic operation, used in a neural network, is performed. Thus, the neural network may be applied to the semiconductor device.

What is claimed is:

1. A semiconductor device comprising:
    a core output driver configured to transmit a first data, output from a core region, to a global input/output (I/O) line when an arithmetic operation is performed;
    a pad input driver configured to transmit a second data, input through a pad region, to the global I/O line when the arithmetic operation is performed; and
    an arithmetic result data generation circuit configured to sequentially receive the first data and the second data, through the global I/O line, to generate a core data and a pad data, respectively, and configured to perform an arithmetic operation, used in a neural network, based on the core data and the pad data, to generate arithmetic data.

2. The semiconductor device of claim 1, wherein the first data is set to have a weighted value, used in the neural network, and the second data is set to have a feature value, used in the neural network.

3. The semiconductor device of claim 1, wherein the first data is set to have a feature value, used in the neural network, and the second data is set to have a weighted value, used in the neural network.

4. The semiconductor device of claim 1,
    wherein the core output driver transmits the first data to the global I/O line when a core output pulse is created,
    wherein the pad input driver transmits the second data to the global I/O line when a pad input pulse is created, and
    wherein the pad input pulse is created after the core output pulse is created.

5. The semiconductor device of claim 1, wherein the arithmetic result data generation circuit is configured to latch the first data, transmitted to the global I/O line, to generate the core data, when a first latch control pulse is created and is configured to latch the second data, transmitted to the global I/O line, to generate the pad data, when a second latch control pulse is created.

6. The semiconductor device of claim 5,
    wherein the first latch control pulse is created based on a core output pulse; and
    wherein the second latch control pulse is created based on a pad input pulse.

7. The semiconductor device of claim 1,
wherein the pad input driver transmits the second data to the global I/O line when a pad input pulse is created,
wherein the core output driver transmits the first data to the global I/O line when a core output pulse is created, and
wherein the core output pulse is created after the pad input pulse is created.

8. The semiconductor device of claim 1, wherein the arithmetic result data generation circuit latches the arithmetic data, based on a third latch control pulse, to output the latched arithmetic data as an arithmetic result data.

9. The semiconductor device of claim 8, further comprising an arithmetic result output driver configured to transmit the arithmetic result data to the global I/O line when an arithmetic read operation is performed.

10. The semiconductor device of claim 9, further comprising a pad output driver configured to transmit data, loaded on the global I/O line, to the pad region when the arithmetic read operation is performed.

11. A semiconductor device comprising:
a first core output driver configured to transmit a first data, output from a first core region, to a first global input/output (I/O) line when an arithmetic operation is performed;
a second core output driver configured to transmit a second data, output from a second core region, to a second global I/O line when the arithmetic operation is performed;
a pad input driver configured to transmit a third data, input through a pad region, to the first and second global I/O lines when the arithmetic operation is performed; and
an arithmetic result data generation circuit configured to receive the first data and the second data, through the first and second global I/O lines, to generate a core data, configured to receive the third data, through the first and second global I/O lines, to generate a pad data, and configured to perform an arithmetic operation, used in a neural network, based on the core data and the pad data to generate arithmetic data.

12. The semiconductor device of claim 11, wherein the first data and the second data are set to have weighted values, used in the neural network, and the third data is set to have a feature value, used in the neural network.

13. The semiconductor device of claim 11, wherein the first data and the second data are set to have feature values, used in the neural network, and the third data is set to have a weighted value, used in the neural network.

14. The semiconductor device of claim 11,
wherein the first core output driver transmits the first data to the first global I/O line when a core output pulse is created,
wherein the pad input driver transmits the third data to the first and second global I/O lines when a pad input pulse is created, and
wherein the pad input pulse is created after the core output pulse is created.

15. The semiconductor device of claim 11,
wherein the second core output driver transmits the second data to the second global I/O line when a core output pulse is created,
wherein the pad input driver transmits the third data to the first and second global I/O lines when a pad input pulse is created, and
wherein the pad input pulse is created after the core output pulse is created.

16. The semiconductor device of claim 11, wherein the arithmetic result data generation circuit is configured to latch the first data, transmitted to the first global I/O line, to generate the core data, when a first latch control pulse is created and is configured to latch the third data, transmitted to the first global I/O line, to generate the pad data when a second latch control pulse is created.

17. The semiconductor device of claim 16,
wherein the first latch control pulse is created based on a core output pulse; and
wherein the second latch control pulse is created based on a pad input pulse.

18. The semiconductor device of claim 11, wherein the arithmetic result data generation circuit is configured to latch the second data, transmitted to the second global I/O line, to generate the core data when a first latch control pulse is created and is configured to latch the third data, transmitted to the second global I/O line, to generate the pad data when a second latch control pulse is created.

19. The semiconductor device of claim 11,
wherein the pad input driver transmits the third data to the first global I/O line and the second global I/O line when a pad input pulse is created,
wherein the first core output driver transmits the first data to the first global I/O line when a core output pulse is created, and
wherein the core output pulse is created after the pad input pulse is created.

20. The semiconductor device of claim 11,
wherein the pad input driver transmits the third data to the first global I/O line and the second global I/O line when a pad input pulse is created,
wherein the second core output driver transmits the second data to the second global I/O line when a core output pulse is created, and
wherein the core output pulse is created after the pad input pulse is created.

21. The semiconductor device of claim 11, wherein the arithmetic result data generation circuit latches the arithmetic data based on a third latch control pulse to output the latched arithmetic data as an arithmetic result data.

22. The semiconductor device of claim 21, further comprising an arithmetic result output driver configured to transmit the arithmetic result data to the first and second global I/O lines when an arithmetic read operation is performed.

23. The semiconductor device of claim 22, further comprising a pad output driver configured to transmit data, loaded on the first and second global I/O lines, to the pad region when the arithmetic read operation is performed.

24. A semiconductor device comprising:
a command decoder configured to generate a core output pulse, a first latch control pulse, a pad input pulse, a second latch control pulse, and a third latch control pulse when an arithmetic operation is performed; and
a neural network circuit configured to transmit a first data, stored in a core region, to a global input/output (I/O) line when the core output pulse is created, configured to latch the first data, transmitted to the global I/O line, to generate a core data when the first latch control pulse is created, configured to transmit a second data, input through a pad region, to the global I/O line when the pad input pulse is created, and configured to latch the second data, transmitted to the global I/O line, to generate a pad data when the second latch control pulse is created.

25. The semiconductor device of claim 24, wherein the first data is set to have a weighted value, used in a neural network, and the second data is set to have a feature value, used in the neural network.

26. The semiconductor device of claim 24, wherein the first data is set to have a feature value, used in a neural network, and the second data is set to have a weighted value, used in the neural network.

27. The semiconductor device of claim 24,
wherein the pad input pulse is created after the core output pulse is created,
wherein the first latch control pulse is created based on the core output pulse, and
wherein the second latch control pulse is created based on the pad input pulse.

28. The semiconductor device of claim 24,
wherein the core output pulse is created after the pad input pulse is created,
wherein the first latch control pulse is created based on the core output pulse, and
wherein the second latch control pulse is created based on the pad input pulse.

29. The semiconductor device of claim 24, wherein the neural network circuit is configured to perform the arithmetic operation, used in a neural network, based on the core data and the pad data to generate an arithmetic data.

30. The semiconductor device of claim 29, wherein the neural network circuit is configured to latch the arithmetic data, based on the third latch control pulse, to output the latched arithmetic data as an arithmetic result data.

31. The semiconductor device of claim 30,
wherein the command decoder generates a latch output pulse when an arithmetic read operation is performed, and
wherein the neural network circuit outputs the arithmetic result data to the global I/O line based on the latch output pulse.

32. A semiconductor device comprising:
a command decoder configured to generate a selection signal, a core output pulse, a first latch control pulse, a pad input pulse, a second latch control pulse, and a third latch control pulse when an arithmetic operation is performed; and
a neural network circuit configured to transmit a first data stored in a first core region to a first global input/output (I/O) line or to transmit a second data stored in a second core region to a second global I/O line when the core output pulse is created, configured to latch the first data, transmitted to the first global I/O line, to generate a core data or to latch the second data, transmitted to the second global I/O line, to generate the core data when the first latch control pulse is created, configured to transmit a third data input through a pad region, to the first and second global I/O lines when the pad input pulse is created, and configured to latch the third data, transmitted to the first and second global I/O lines, to generate a pad data when the second latch control pulse is created.

* * * * *